March 13, 1956   P. LETRILLIART ET AL   2,738,454
CONTROL SYSTEMS FOR WARD-LEONARD GROUP
Original Filed Oct. 15, 1948
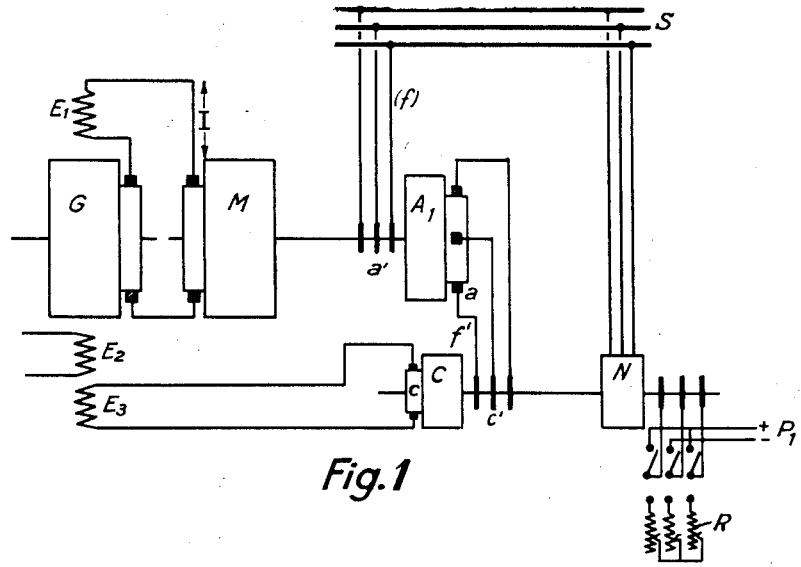
Fig.1
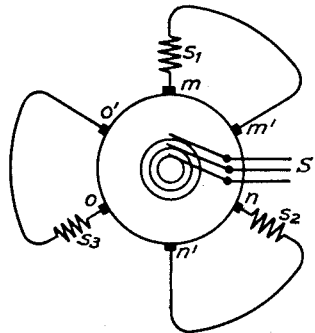
Fig.2
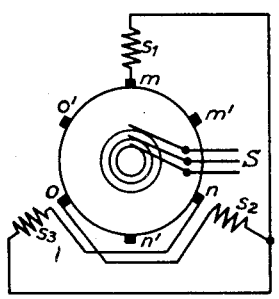
Fig.3
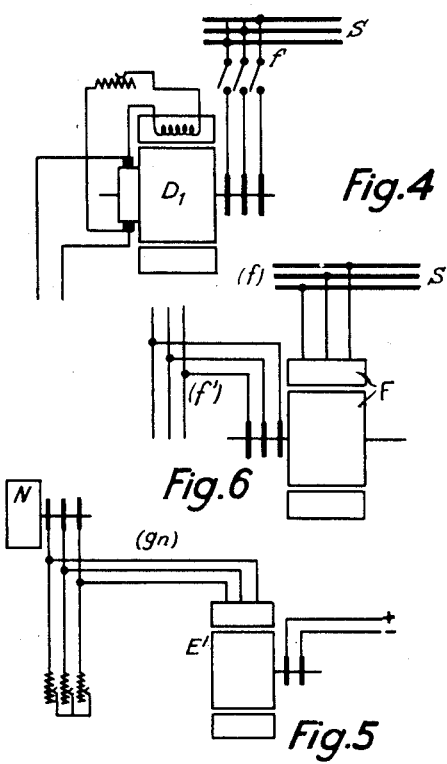
Fig.4
Fig.6
Fig.5
INVENTORS
Pierre Letrilliart
Jacques Bichet
BY
ATTORNEYS United States Patent Office 2,738,454
Patented Mar. 13, 1956

2,738,454

CONTROL SYSTEMS FOR WARD-LEONARD GROUP

Pierre Letrilliart and Jacques Bichet, Jeumont, France, assignors to Forges et Ateliers de Constructions Electriques de Jeumont, Paris, France, a corporation of France Original application October 15, 1948, Serial No. 54,752. Divided and this application February 24, 1950, Serial No. 145,962

Claims priority, application France October 20, 1947

4 Claims. (Cl. 318—146)

The present invention refers to control systems for Ward-Leonard groups in which an auxiliary rotary machine arranged as a frequency changer is mechanically coupled to or keyed upon the shaft of the main motor for regulation purposes.

An object of the invention is to extend within wide limits the range of speed regulation of the main motor, comprising the lowest values and even the complete stoppage (zero speed). Another object of the invention is to produce an accurate adjustment of the number of revolutions performed by the main motor, and to produce adjustable angular movements or part-revolution of this motor. The invention has likewise for an object the provision of means for increasing the stability of the regulations and adjustments obtained.

The known control systems of this kind are able to regulate and to stabilize the speed of the main Ward-Leonard motor, but only within a limited range and not down to complete stoppage. These limitations are mainly due to the serious drop of voltage across the commutator brushes of the auxiliary machine at very low values of its speed and frequency. As a result, this output voltage, which is used for energizing a field winding of the Ward-Leonard generator, is subject to variations which are not proportional to the variations of the frequency (or speed) and therefore the regulation is not accurate.

According to the present invention, such limitations are avoided by the use of two rotary frequency changers instead of a single one, these two machines being connected in cascade. The first frequency changer, energized from a power system having a constant reference frequency, is driven by the main motor to be regulated; the second is driven by a pilot-motor at a speed which is a definite function of the speed of the main motor, whereby the output voltage appearing across the commutator brushes of the second frequency changer has a zero frequency, representing direct current. This direct-current output voltage being used for energizing a field winding of the Ward-Leonard generator, the speed of the main motor is a definite function of the speed of the second frequency changer driven by the pilot motor.

In particular, if the second frequency changer is driven at the speed of synchronism in relation to said reference frequency, the speed of the main motor is equal to zero and automatically maintained at this value, as it will be explained later.

On the other hand, the value of the zero-frequency or direct-current voltage, which appears across the commutator brushes of the second frequency changer, can be controlled by various parameters, whereby different kinds of regulations, controls, compoundings of the main motor, as well as measurements can be effected.

This application is a division of our application Serial No. 54,752, filed October 15, 1948, now abandoned.

The objects and advantages of the present invention will be explained hereinafter with reference to the accompanying drawings in which:

Fig. 1 is a control diagram of a Ward-Leonard group.

Figs. 2 and 3 represent alternative connections of a pilot motor which can be synchronized without direct-current feed.

Fig. 4 relates to another form of the pilot motor.

Figs. 5 and 6 represent means for limiting the number of revolutions performed by the pilot motor.

One embodiment of the invention can be arranged for example in accordance with Fig. 1, which shows a direct-current group comprising a generator G and a main motor M of which the speed is to be regulated, for example from zero to 750 revolutions per minute, by variation of the field and voltage of the generator G according to the well-known Ward-Leonard system.

To the end of the motor shaft there is coupled the first auxiliary machine having the form of a frequency changer $A_1$, which comprises for example $2p=4$ poles, and of which the rings $a'$ are fed with three-phase current by the source S having a constant reference frequency $f$, equal for example to 50 cycles per second. The frequency $f$ should preferably be substantially greater than the frequency $f_1$ appearing across the brushes $a$, which would correspond to synchronism of the machine $A_1$ at its maximum speed, that is to say at 750 revolutions per minute. The machine $A_1$ being of four-pole type, this frequency $f_1$ will be 25 cycles per second at 750 revolutions per minute, so that the preferred relation will in fact be provided.

When the main motor M is at rest, the frequency $f_1$ will be 50 cycles per second.

This variable output frequency $f'$ is transmitted to the slip rings $c'$ of a second auxiliary machine C which is likewise a frequency changer or rotary converter having a suitable number of poles, equal to $2p'$, and which is driven by an adjustable speed motor N, herein termed a pilot motor. For a certain speed $n_2$ of the pilot motor, the frequency collected by the brushes $c$ (which engage on the commutator of the machine C) becomes zero, which means that these brushes collect direct current.

It can be shown that this speed $n_2$ is given by the formula:

$$p' n_2 + p\ n_1 = 60\ f$$

where:

$p'$ is the number of pairs of poles on the machine C;
$p$ is the number of pairs of poles on the machine $A_1$;
$n_1$ is the number of revolutions per minute of the main motor M and of the auxiliary machine $A_1$;
$n_2$ is the requisite speed in revolutions per minute of the pilot motor N; and
$f$ is the reference frequency of the source S.

Assuming that $p'=p=2$, and $f=50$ cycles per second, for example, there is obtained for $n_1=0$ (motor M at rest), $n_2=1500$ revolutions per minute;
for $n_1=375$ revolutions per minute (motor M at half speed), $n_2=1125$ revolutions per minute;
for $n_1=750$ revolutions per minute (motor M at full speed), $n_2=750$ revolutions per minute.

It can be seen that in this particular case, $n_1+n_2=n_3$, where $n_3$ is the speed of synchronism of the frequency changers for the reference and supply frequency $f$.

The direct voltage which appears between the brushes $c$ when the speeds $n_1$ and $n_2$ of the machines M and N are in accordance with the above formula, can be used for exciting an auxiliary winding $E_3$ of the generator G, which co-operates in any suitable manner with the regular field windings $E_1$ and $E_2$. If the speed of the motor M tends to vary from that for which the frequency across the brushes $c$ is zero, the axis of the magnetic field of the auxiliary machine C is no longer stationary. This axis effects an angular displacement in one direction or in the other, the direct-current voltage at the brushes $c$ is thereby modified, and the current I received by the motor M from the generator G is suitably adjusted so as to reestablish the correct speed.

When the field winding $E_3$ is energized by direct current, there is obtained, according to the adjustment of the field winding $E_2$, a resultant field such that the speed of the main motor M is maintained constant. The value of this constant speed depends on the adjustment of the field winding $E_2$ and of the speed $n_2$ of the pilot motor N, and for a certain adjustment thereof, there will be obtained a constant speed equal to zero, the main motor being then at a standstill. The resultant field which corresponds to this particular case is not necessarily zero, but it depends evidently upon the torque which the motor M has to develop when at rest.

If now, the constant speed of the motor M (for example, zero speed) tends to depart from the desired value, there is produced the automatic regulation described above.

The method of regulation which has just been described maintains its full efficacy at the lowest speeds and even at complete stoppage of the motor M. In fact, it has been seen above that if $n_2=1500$ revolutions per minute, the speed $n_1$ of the main motor M is zero, or in other words it suffices to cause the pilot motor N to run at the synchronous speed of the auxiliary machine C, that is to say, in the example considered, at 1500 revolutions per minute, for the motor M to come to rest; there appears at the terminals of the field winding $E_3$ a suitable direct-current voltage which ensures the main motor M remaining stationary.

For the purpose of giving a desired speed to the second frequency changer C, there can be utilized as shown a pilot motor N of the adjustable slip-ring induction type with a slip rheostat R, fed at the frequency $f$ and arranged so that its synchronous speed shall be the same as that of the machine C for this frequency; it suffices then to inject direct current into this motor in the well-known manner in order to synchronize it, such a direct-current synchronizing circuit being represented diagrammatically at $P_1$ in Fig. 1.

Instead of having the machines A and M at rest and the machine N rotating at the speed of synchronism, the speed of the machine N can be adjusted for obtaining any desired speed of the main motor M. This adjustment is effected according to the formula given above, i. e. in such a proportion that a direct-current voltage still appears across the commutator brushes of the second frequency changer C. In this way, any desired speed of the main motor M can be obtained and stabilized, the pilot-motor N not being synchronized by direct-current, but controlled by means of a slip rheostat R such as shown in Fig. 1, the change-over being effected by a conventional two-way switch.

If no suitable direct-current supply is available, the pilot motor N may take the form of the well-known polyphase commutator motor with a double set of brushes and "shunt" characteristics. This machine may be for instance of the type shown in Fig. 14 of Harold Pender's "Electrical Engineer's Hand-Book," 4th edition, page 9–104. By merely crossing the connections of two phase windings between the rotor and the stator of such a machine synchronous operation is obtained.

Figs. 2 and 3 represent diagrammatically this method of synchronization. In Fig. 2 there is shown the diagram of connections of a known motor of this type. S is the same three-phase supply source as in Fig. 1, $m$, $n$, $o$, and $m'$, $n'$, $o'$, the two sets of brushes, and $s_1$, $s_2$, $s_3$ the stator windings.

When the speed of such a motor is approximately equal to that of synchronism with respect to the frequency $f$ of the source S, the field produced by the rotor tends to become fixed in space; in order to fix it definitely the connections of the pilot motor N are rearranged as shown in Fig. 3, by crossing the leads of two stator phases, for example $s_2$ and $s_3$, and connecting together the other terminals of the three phases, as shown, which has the effect of circulating direct current in the stator; such a pilot motor N then operates as asynchronous motor at the frequency $f$ and the auxiliary machine C of Fig. 1 is driven at its speed of synchronism corresponding to the frequency $f'$ obtained from the machine $A_2$.

It is also possible as illustrated in Fig. 4, to utilize as pilot motor a machine $D_1$ of the rotary converter type having the same number of poles as the auxiliary motor N of Fig. 1. This machine starts and operates normally as a direct current motor, being energized by a direct-current source B. The speed of synchronism is imposed by applying the reference frequency $f$ to its rings, as shown in Fig. 4. Any other device for ensuring synchronism of the machine C may be used.

In order to obtain a main motor speed other than zero, the speed of the pilot motor shown in Fig. 2 can be regulated to values different from the speed of synchronism by merely shifting its brushes. In the case of the pilot motor shown in Fig. 4, the polyphase power supply will be interrupted and the machine will be regulated like a direct-current motor.

It is to be noted that the above means for controlling the stoppage of the main motor M by the synchronization of the machine C or for obtaining various speeds of the main motor M, by adjusting the speed of the pilot motor, are independent of the frequency of the source S and of its possible variations, because the pilot motor N is energized by the same source S as the rings $a'$ of the machine $A_1$.

The improved control system as described may be utilized for the regulation of mine-hoists, rolling mills, elevator motors, printing and paper-making machines, and so on. In particular, when the motor M drives mine-hosts, elevators and the like, in which the travel must be regulated very accurately, the system shown in Fig. 1 can be adapted so that the motor M effects a predetermined number of revolutions before stopping. In this case, the pilot motor N must effect a predetermined number of revolutions in relation to its rotating field produced by the supply source S, because it will be understood that the speed $n_1$ of the main motor M is proportional to the slip of the pilot-motor N, according to the relation $$n_1=\frac{p'}{p}n_s\cdot g_n$$

where:

$n_s$ is the speed of synchronism of the motor N, and $g_n$ the slip of that motor.

Such a result can be obtained by means of control and revolution-counting apparatus as shown in Figs. 5 and 6, sensitive to the slip of the pilot motor N and arranged to close its synchronization circuit P after a desired number of cycles of its rotor current. According to Fig. 5, an auxiliary synchronous motor E' is energized by the rotor of the pilot motor N at the slip frequency $g_n$. The motor E' comprises a suitable switch (not shown, but in the form for example of any conventional ratchet-type counter operating a contact device), which is adapted to close the synchronizing direct-current circuit P (Fig. 1) after a desired number of revolutions of E'; this number corresponds obviously to the cycles of the rotor current of the pilot motor N.

There may again be utilized, as shown in Fig. 6, an auxiliary synchronous motor F of which the stator will be fed with the frequency $f$, and the rotor, connected to the output circuit of the first frequency changer $a_1$, with the frequency $f'$, or vice versa, this motor then operating to close a synchronizing device or circuit of the pilot motor $n$ at the end of a certain number of revolutions.

The invention also allows of obtaining accurate angular movements of the main motor M, which are equal or proportional to angular movements of a control element such as a handle or any other device or machine. It will be assumed that for a given position of the handle, the motor M is stopped and maintained in a certain position as described above. A definite angular movement of the control handle will modify the value of the field current delivered by the machine C to the winding $E_3$ of the generator G (Fig. 1); the voltage energizing the main motor M will vary accordingly and the motor will start to revolve. This movement is effected in a direction such that it reduces and compensates the angular displacement which the operator has produced between the field and the brushes of the machine C by his adjustment of the control handle. The movement of the main motor will continue therefore until the moment when this angular displacement becomes equal to zero; at that moment, the former balance will be re-established, that is to say, the motor M will come to rest and remain stationary, as before, but in a fresh position which corresponds to the position of the control handle moved by the operator.

In certain cases, in order to ensure proper stability of operation, a certain degree of statism or insensitiveness will have to be introduced into the system. This effect can be obtained by conventional damping means upon the machine C for the purpose of eliminating the oscillations of the system, or by suitably modifying the speed of the pilot motor N according to the loading of the main motor M.

Whatever be the applications of the invention, it must be understood that the regulations or measurements which it allows of providing are effected very rapidly and with simple, effective and robust means.

What we claim is:

1. In a system for controlling the speed of a main motor forming part of a motor-generator set of the Ward-Leonard type, the combination of two rotary frequency changers connected in cascade, the first of said frequency changers being driven by the motor of said set, and the slip-rings of said first frequency changer being connected to a polyphase network having a reference frequency, while the second of said frequency changers is connected to be energized by the output voltage at the commutator brushes of said first frequency changer and arranged to be driven separately at a speed of synchronism in relation to said reference frequency, the commutator brushes of said second frequency changer being connected across a field winding upon the generator of said set.

2. A system for controlling the speed of a main motor forming part of a motor-generator set of the Ward-Leonard type by means of rotary frequency changers, comprising a first frequency changer arranged to be driven by the motor of said set, the slip-rings of said first frequency changer being connected to a polyphase network having a reference frequency, a second frequency changer having its slip-rings connected in cascade to the commutator brushes of said first frequency changer, a field winding upon the generator of said set, said winding being connected across the commutator brushes of said second frequency changer, an independent adjustable field winding upon said generator, and an adjustable speed pilot motor adapted to drive said second frequency changer at a selected constant speed, whereby the speed of said main motor will be maintained at a constant value.

3. A system for controlling the main motor of a motor-generator set of the Ward-Leonard type by means of two rotary frequency changers comprising a first frequency changer arranged to be driven by the motor of said set, the slip-rings of said first frequency changer being connected to a polyphase power source, a second frequency changer having its slip-rings connected in cascade to the commutator brushes of said first frequency changer, a differential field winding upon the generator of said set, said winding being connected across the commutator brushes of said second frequency changer, and a pilot motor adapted to drive said second frequency changer at a desired constant speed.

4. In a Ward-Leonard set having a main motor and a main generator controlled by a system according to claim 2, means for producing definite angular movements of said main motor from the stopped condition, comprising an independent field winding upon said main generator, and means for adjusting said independent field winding.

References Cited in the file of this patent

UNITED STATES PATENTS

| | | |
|---|---|---|
| 1,060,208 | Osborne | Apr. 29, 1913 |
| 1,423,518 | Espenschield | July 25, 1922 |
| 1,578,971 | Fleischmann | Mar. 30, 1926 |
| 1,894,810 | Winter | Jan. 17, 1933 |

FOREIGN PATENTS

| | | |
|---|---|---|
| 322,011 | Great Britain | Nov. 28, 1929 |
| 395,011 | Great Britain | July 3, 1933 |